United States Patent
Delfs et al.

(10) Patent No.: US 9,456,189 B2
(45) Date of Patent: Sep. 27, 2016

(54) PROJECTOR, AND METHOD FOR CONTROLLING A PROJECTOR ACCORDING TO THE INVENTION

(71) Applicant: Robert Bosch GmbH, Stuttgart (DE)

(72) Inventors: Christoph Delfs, Bretten (DE); Frank Fischer, Gomaringen (DE); Marcellino Gemelli, Mountain View, CA (US); Alexander Ehlert, Schwaebisch Gmuend (DE); Daniel Kreye, Reutlingen (DE); Mathias Schmauke, Neustetten (DE)

(73) Assignee: ROBERT BOSCH GMBH, Stuttgart (DE)

( * ) Notice: Subject to any disclaimer, the term of this patent is extended or adjusted under 35 U.S.C. 154(b) by 291 days.

(21) Appl. No.: 14/277,308

(22) Filed: May 14, 2014

(65) Prior Publication Data

US 2014/0340655 A1 Nov. 20, 2014

(30) Foreign Application Priority Data

May 14, 2013 (DE) .................. 10 2013 208 815

(51) Int. Cl.
| | |
|---|---|
| *G03B 21/14* | (2006.01) |
| *H04N 9/31* | (2006.01) |
| *G03B 21/20* | (2006.01) |
| *G02B 27/01* | (2006.01) |

(52) U.S. Cl.
CPC ........ *H04N 9/3129* (2013.01); *G03B 21/2033* (2013.01); *G03B 21/2053* (2013.01); *H04N 9/3135* (2013.01); *G02B 27/01* (2013.01)

(58) Field of Classification Search
CPC .............. G03B 21/2033; G03B 21/28; G03B 21/2053; H04N 9/31298; H04N 9/3135
USPC ......... 359/204.2, 212.1, 213.1, 223.1, 224.1; 353/85
See application file for complete search history.

(56) References Cited

U.S. PATENT DOCUMENTS

| | | | | |
|---|---|---|---|---|
| 7,098,871 | B1 * | 8/2006 | Tegreene ............. | G02B 26/101 345/7 |
| 7,516,896 | B2 * | 4/2009 | Helsel ................ | G02B 26/0833 235/454 |
| 7,920,213 | B2 * | 4/2011 | Oettinger ............. | H04N 9/3129 347/235 |
| 8,098,414 | B2 * | 1/2012 | Nojima ................ | H04N 9/3129 345/9 |
| 8,395,633 | B2 * | 3/2013 | Kurozuka ............ | G02B 26/101 345/545 |
| 2002/0050956 | A1 * | 5/2002 | Gerhard ............... | G02B 27/017 345/7 |
| 2013/0070209 | A1 | 3/2013 | Cantelobre | |

* cited by examiner

*Primary Examiner* — William C Dowling
(74) *Attorney, Agent, or Firm* — Norton Rose Fulbright US LLP

(57) ABSTRACT

A projector having at least one laser diode which is designed to emit light, having a laser control device which is designed to control the at least one laser diode, having a first controllable resonant mirror which is designed to reflect the light that is emitted by the laser diode, and having a control device which is designed to control the orientation of the first controllable resonant mirror. The control device is further designed to reduce the power supply to the laser diode and to the laser control device in a first configuration of a power-saving mode of the projector, and to further control the orientation of the first controllable resonant mirror at a resonant frequency of the first controllable resonant mirror. Moreover, a corresponding method is described.

13 Claims, 3 Drawing Sheets

PROJECTOR, AND METHOD FOR CONTROLLING A PROJECTOR ACCORDING TO THE INVENTION

FIELD OF THE INVENTION

The present invention relates to a projector and a corresponding method for controlling a projector according to the present invention.

BACKGROUND INFORMATION

Although the present invention is described below with reference to projectors for video glasses, it is not limited thereto. Rather, the present invention may be used with any arbitrary projectors, such as projectors for head-up displays in vehicles.

Projectors are currently used in numerous applications, in particular so-called miniature projectors or microprojectors, also in mobile form.

Mobile applications may be, for example, video glasses or display devices for mounting on glasses. In such applications, information may be projected to a user directly into his/her visual field and superimposed on the field of view of the user.

It is known to use projectors, having a laser light source and a laser scanner or MEMS mirror, for example, for mobile operation, since these projectors may be designed for a very small installation space.

Glasses having such a display device, i.e., video glasses, are put on by a user and worn on the head, i.e., on the face. Therefore, these projectors must be as small and lightweight as possible. In addition, the projector should have a preferably long operating period on one battery charge.

Due to the fastening of the projector and the battery to the glasses and on the head of the user, the size of the battery, and therefore its capacity, is also limited. In order to still achieve a long run time of the projector on one battery charge, it is necessary to reduce the energy consumption of the projector.

To meet the requirements for low energy consumption, in present projectors the laser diodes as well as the MEMS scanners and the video electronics are optimized in order to reduce their energy demand. In addition, more efficient concepts for supplying power to the projectors are being developed.

United States Published Patent Appln. No. 20130070209 describes, for example, a projector having MEMS mirrors in which the intensity of the laser light source is set as a function of the contrast of a scan line.

However, the mentioned measures still do not allow extended operation of such a projector during mobile use with satisfactory autonomy.

Therefore, there is a need to further reduce the energy consumption of projectors, in particular projectors for mobile use.

SUMMARY

Accordingly, the following is provided:
a projector having at least one laser diode which is designed to emit light, having a laser control device which is designed to control the at least one laser diode, having a first controllable resonant mirror which is designed to reflect the light that is emitted by the laser diode, and having a control device which is designed to control the orientation of the first controllable resonant mirror, the control device being further designed to reduce the power supply to the laser diode and to the laser control device in a first configuration of a power-saving mode of the projector, and to further control the orientation of the first controllable resonant mirror at a resonant frequency of the first controllable resonant mirror;
a method for controlling a projector according to the present invention, having the following steps: reducing the power supply to the electronic components of the projector in a first configuration of a power-saving mode of the projector, and controlling the orientation of at least one first controllable resonant mirror of the projector in the first configuration of the power-saving mode at a resonant frequency of the at least one first controllable resonant mirror.

The underlying finding of the present invention is that a projector which is used during mobile operation, for example in combination with glasses or also, for example, in combination with a head-up display in a vehicle, does not have to display a continuous video stream, but, rather, only has to superimpose individual pieces of information onto the visual field of a user.

The underlying concept of the present invention is to take this finding into account and provide a projector in which electronic components of the projector are selectively switched off in an operating phase in which no video data have to be displayed.

In such an operating phase, all important electronic components of the projector are switched off or placed in a low-power or ultralow-power mode. These electronic components may be, for example, laser diodes, laser drivers, video controllers, and the like.

However, the present invention also provides that a portion of the electronic components of the projector continues to be operated. In particular, that portion of the electronic components of the projector which controls the orientation of the first controllable resonant mirror of the projector continues to be operated.

The first controllable resonant mirror of a projector, which is used to deflect the light beam of the laser diode and move line by line over the projection surface, has a very long start-up time. In particular, the first controllable resonant mirror has the longest start-up time of all the electronic components of the projector. The start-up time of the first controllable resonant mirror may be up to several hundred milliseconds, for example up to 500 ms.

In contrast, it takes purely electrical components only several milliseconds to "wake up."

If the orientation of the first controllable resonant mirror of the projector is now further controlled at a resonant frequency of the first controllable resonant mirror, in an operating phase in which no video data have to be displayed, the projector may display video data very quickly when necessary and still allow a power-saving operation.

In one specific embodiment, the projector has a second controllable mirror, the control device being designed to control the orientation of the first controllable resonant mirror and/or of the second controllable mirror in the power-saving mode. This allows a flexible design of the projector.

In one specific embodiment, the control device is designed to set the orientation of the second controllable mirror in at least one movable axis of the second controllable mirror in a practically steady-state manner. This allows the second controllable mirror to be set to the starting position for video output when already in the power-saving mode, thus accelerating the start-up process of the projector from the power-saving mode.

In one specific embodiment, the control device has a first driver device which includes a first actuating device for controlling the orientation of the first controllable resonant mirror.

In one specific embodiment, the control device has a second actuating device for controlling the orientation of the second controllable mirror.

The partitioning of the control device allows operation, in the power-saving mode, of only those components of the control device that are necessary for controlling the first controllable resonant mirror and/or the second controllable mirror.

In one specific embodiment, in the power-saving mode, the control device is designed to control the orientation of the first controllable resonant mirror in at least one movable axis of the first controllable resonant mirror at a resonant frequency of the first controllable resonant mirror in the at least one movable axis of the first controllable resonant mirror. Very efficient control is possible when the control frequency of the first controllable resonant mirror is coordinated with the movable axes of the first controllable resonant mirror.

In one specific embodiment, in the power-saving mode, the control device is designed to control the orientation of the first controllable resonant mirror in two movable axes of the first controllable resonant mirror at a resonant frequency of the first controllable resonant mirror in the two movable axes of the first controllable resonant mirror. This allows a design of a projector which has only a single controllable mirror. This simplifies the design of the projector as well as the internal structure of the control device, since only one controllable resonant mirror has to be controlled.

In one specific embodiment, in the power-saving mode, the control device is designed to control the orientation of the first controllable resonant mirror in at least one movable axis of the first controllable resonant mirror at a resonant frequency of the first controllable resonant mirror in the at least one movable axis of the first controllable resonant mirror, with an amplitude that corresponds to the control amplitude of the first controllable resonant mirror in a normal projection mode of the projector. When the first controllable resonant mirror is also operated with the same amplitude in the power-saving mode, which corresponds to the control amplitude of the first controllable resonant mirror in a normal projection mode of the projector, the first controllable resonant mirror is immediately ready for use, and it is not necessary to leave the power-saving mode before being placed in operation.

In one specific embodiment, in the power-saving mode, the control device is designed to control the orientation of the first controllable resonant mirror in at least one movable axis of the first controllable resonant mirror at a resonant frequency of the first controllable resonant mirror in the at least one movable axis of the first controllable resonant mirror, with an amplitude that is smaller than the control amplitude of the first controllable resonant mirror in a normal projection mode of the projector. The energy demand of the projector may be further reduced when the first controllable resonant mirror is operated in the power-saving mode with an amplitude that is smaller than the control amplitude of the first controllable resonant mirror in a normal projection mode of the projector.

In one specific embodiment, the difference between the amplitude with which the first controllable resonant mirror is operated in the power-saving mode and the control amplitude of the first controllable resonant mirror in a normal projection mode is selected in such a way that the start-up time of the first controllable resonant mirror is as long as the remaining electronic components of the projector need for switching from the power-saving mode into the normal projection mode.

In one specific embodiment, the control device is designed to switch off the laser diode, the laser control device, the driver device, and the second actuating device, and to supply the first actuating device with power, in the first configuration of the power-saving mode. This configuration of the power-saving mode allows power-saving operation of the projector while still allowing rapid start-up of the projector.

In one specific embodiment, the control device is designed to switch off the laser diode, the laser control device, the driver device, and the first and/or second actuating device in a second configuration of the power-saving mode. This configuration allows very large energy savings when the projector does not have to project video data in the foreseeable future.

In one specific embodiment, the control device is designed to switch off the laser diode and the laser control device, and to supply the driver device, the first actuating device, and the second actuating device with power, in a third configuration of the power-saving mode.

In one specific embodiment, the control device is designed to switch off the laser diode and the laser control device, and to supply the driver device, the first actuating device, the second actuating device, and a video controller of the projector with power, in a fourth configuration of the power-saving mode.

The different configurations of the power-saving mode allow a specific adaptation of the energy demand of the projector to the particular application.

The above-mentioned embodiments and refinements may be arbitrarily combined with one another when this is meaningful. Further possible embodiments, refinements, and implementations of the present invention include combinations of features of the present invention described above or explained below with reference to the exemplary embodiments, even if not explicitly mentioned. In particular, those skilled in the art will also add individual aspects as enhancements or supplements to the particular basic form of the present invention.

BRIEF DESCRIPTION OF THE DRAWINGS

Identical or functionally equivalent elements and devices have been provided with the same reference numerals in all figures unless stated otherwise.

DETAILED DESCRIPTION

Figure 1:
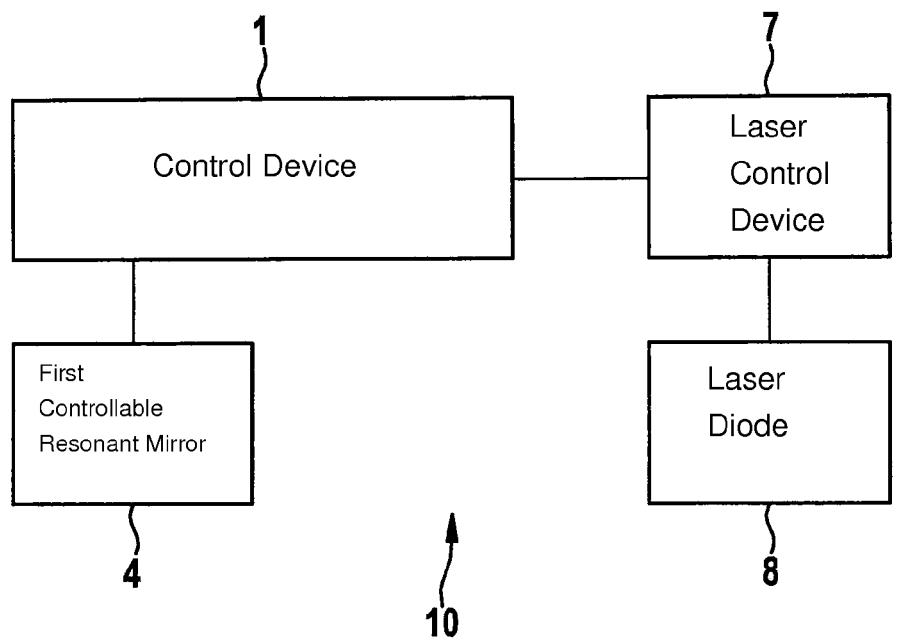
FIG. 1 shows a block diagram of one specific embodiment of a projector according to the present invention.

FIG. 1 shows a block diagram of one specific embodiment of a projector 10 according to the present invention.

Projector 10 in FIG. 1 has a control device 1 which is coupled to a laser control device 7 and to a first controllable resonant mirror 4.

Laser control device 7 is coupled to laser diode 8 and is designed to control laser diode 8.

In addition, first controllable resonant mirror 4 is situated in such a way that it reflects the light which is emitted by laser diode 8.

Control device 1 is designed to control the orientation of first controllable resonant mirror 4.

Control device 1 is also designed to reduce the power supply to laser diode 8 and to laser control device 7, and to further control the orientation of first controllable resonant mirror 4 at a resonant frequency of first controllable resonant mirror 4, in a first configuration of a power-saving mode of projector 10.

Due to acquiring the resonant oscillation in use phases in which no projection is output, a power-saving mode of the projector may be utilized to save electrical power and still provide full operational readiness of projector 10 within a few 10 ms.

In particular, the energy demand of the projector in the power-saving mode may be reduced to 5 mW-30 mW.

In particular, the power-saving mode of projector 10 may be switched on when a video projection is expected in the near future, but when at that moment no video projection is taking place.

In one specific embodiment, this allows the average power consumption of the projector to be reduced to below 100 mW.

In one specific embodiment, projector 10 has more than one laser diode 8. In particular, in one specific embodiment, projector 10 has three laser diodes having different colors, such as red, green, and blue.

Figure 2:
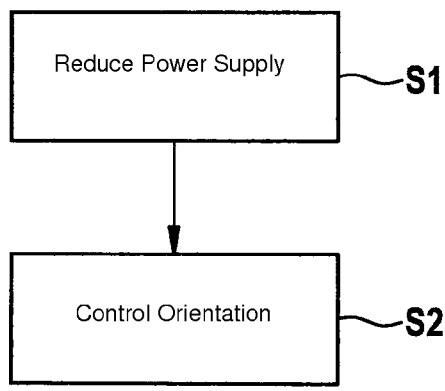
FIG. 2 shows a flow chart of one specific embodiment of a method according to the present invention.

FIG. 2 shows a flow chart of one specific embodiment of a method according to the present invention.

The power supply to electronic components 1, 7, 8 of projector 10 is reduced in a first configuration of a power-saving mode of projector 10 in a first step S1.

In a second step S2 of the method, the orientation of at least one first controllable resonant mirror 4 of projector 10 is controlled at a resonant frequency of the at least one first controllable resonant mirror 4 in the first configuration of the power-saving mode.

In another specific embodiment which is not illustrated, the method provides the additional step of controlling the orientation of first controllable resonant mirror 4 and/or of a second controllable mirror 5 in the power-saving mode.

In another specific embodiment which is not illustrated, during the control of the orientation of second controllable mirror 5, the orientation of second controllable mirror 5 in at least one movable axis of second controllable mirror 5 is set in a practically steady-state manner.

In another specific embodiment which is not illustrated, during the control of the orientation of first controllable resonant mirror 4 in the power-saving mode, the orientation of first controllable resonant mirror 4 in at least one movable axis of first controllable resonant mirror 4 is controlled at a resonant frequency of first controllable resonant mirror 4 in the at least one movable axis of first controllable resonant mirror 4.

In another specific embodiment which is not illustrated, during the control of the orientation of first controllable resonant mirror 4, in the power-saving mode, the orientation of first controllable resonant mirror 4 in at least one movable axis of first controllable resonant mirror 4 is controlled at a resonant frequency of first controllable resonant mirror 4 in the at least one movable axis of first controllable resonant mirror 4, with an amplitude that corresponds to the control amplitude of first controllable resonant mirror 4 in a normal projection mode of projector 10.

In another specific embodiment which is not illustrated, in the power-saving mode, the orientation of first controllable resonant mirror 4 in at least one movable axis of first controllable resonant mirror 4 is controlled at a resonant frequency of first controllable resonant mirror 4 in the at least one movable axis of first controllable resonant mirror 4, with an amplitude that is smaller than the control amplitude of first controllable resonant mirror 4 in a normal projection mode of projector 10.

In another specific embodiment which is not illustrated, laser diode 8, laser control device 7, driver device 2, and second actuating device 6 are switched off, and first actuating device 3 is supplied with electrical power, in the first configuration of the power-saving mode.

In another specific embodiment which is not illustrated, laser diode 8, laser control device 7, driver device 2, and first and/or second actuating device 3, 6 are switched off in a second configuration of the power-saving mode.

In another specific embodiment which is not illustrated, laser diode 8 and laser control device 7 are switched off, and driver device 2, first actuating device 3, and second actuating device 6 are supplied with electrical power in a third configuration of the power-saving mode.

In another specific embodiment which is not illustrated, laser diode 8 and laser control device 7 are switched off, and driver device 2, first actuating device 3, second actuating device 6, and a video controller 9 of projector 10 are supplied with electrical power, in a fourth configuration of the power-saving mode.

Figure 3:
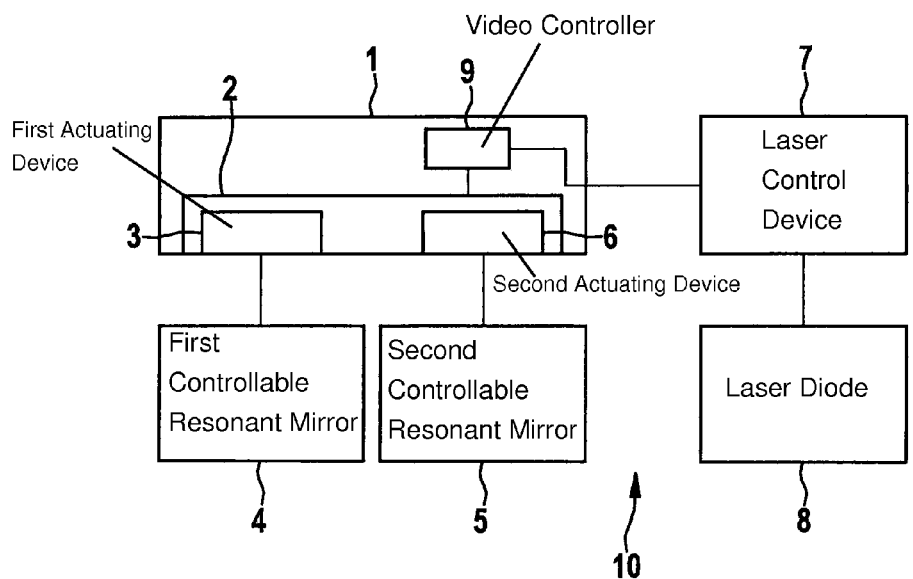
FIG. 3 shows a block diagram of another specific embodiment of a projector according to the present invention.

FIG. 3 shows a block diagram of another specific embodiment of a projector 10 according to the present invention.

Projector 10 in FIG. 3 differs from projector 10 in FIG. 1, in that control device 1 of projector 10 has a driver device 2 which includes a first actuating device 3 and a second actuating device 6. In addition, control device 1 has a video controller 9 which is coupled to driver device 2 and to laser control device 7.

Lastly, first actuating device 3 is coupled to first controllable resonant mirror 4, and second actuating device 6 is coupled to a second controllable mirror 5.

Projector 10 in FIG. 3 is a projector 10 having two mirrors 4 and 5. The first mirror is a first controllable resonant mirror 4 which is designed to horizontally guide, from right to left, the light which is emitted by laser diode 8. The second mirror is designed to vertically deflect, from top to bottom, the light of laser diode 8 which is reflected from first controllable resonant mirror 4.

First actuating device 3 and a second actuating device 6 control mirrors 4 and 5 in such a way that first controllable resonant mirror 4 horizontally deflects the light in each case along a line of the image to be projected, and second controllable mirror 5 subsequently shifts the light further down by one line.

Since second controllable mirror 5 changes its position at a significantly lower frequency than first controllable resonant mirror 4, the operation of second controllable mirror 5 is also referred to as quasi-steady-state or practically steady-state operation.

In another specific embodiment, the directions or the sequence of the mirrors may also be interchanged.

In another specific embodiment, projector 10 has only a single controllable mirror 4, which is deflectable in two axes. The mirror may have a resonant design in one axis or in both axes.

In another specific embodiment, in the power-saving mode, control device 1 is designed to control the orientation of first controllable resonant mirror 4 in at least one movable axis of first controllable resonant mirror 4 at a resonant frequency of first controllable resonant mirror 4 in the at least one movable axis of first controllable resonant mirror 4.

In another specific embodiment, in the power-saving mode, control device 1 is designed to control the orientation of first controllable resonant mirror 4 in at least one movable axis of first controllable resonant mirror 4 at a resonant frequency of first controllable resonant mirror 4 in the at least one movable axis of first controllable resonant mirror 4, with an amplitude that corresponds to the control amplitude of first controllable resonant mirror 4 in a normal projection mode of projector 10.

In another specific embodiment, in the power-saving mode, control device 1 is designed to control the orientation of first controllable resonant mirror 4 in at least one movable axis of first controllable resonant mirror 4 at a resonant frequency of first controllable resonant mirror 4 in the at least one movable axis of first controllable resonant mirror 4, with an amplitude that is smaller than the control amplitude of first controllable resonant mirror 4 in a normal projection mode of projector 10.

In another specific embodiment, the difference between the amplitude with which first controllable resonant mirror 4 is operated in the power-saving mode and the control amplitude of first controllable resonant mirror 4 in a normal projection mode is selected in such a way that the start-up time of first controllable resonant mirror 4 is as long as the remaining electronic components of the projector need for switching from the power-saving mode into the normal projection mode.

In another specific embodiment, control device 1 is designed to switch off laser diode 8, laser control device 7, driver device 2, and second actuating device 6, and to supply first actuating device 3 with power, in the first configuration of the power-saving mode.

In another specific embodiment, control device 1 is designed to switch off laser diode 8, laser control device 7, driver device 2, and first and/or second actuating device 3, 6 in a second configuration of the power-saving mode.

In another specific embodiment, control device 1 is designed to switch off laser diode 8 and laser control device 7, and to supply driver device 2, first actuating device 3, and second actuating device 6 with power, in a third configuration of the power-saving mode.

In another specific embodiment, control device 1 is designed to switch off laser diode 8 and laser control device 7, and to supply driver device 2, first actuating device 3, second actuating device 6, and a video controller 9 of projector 10 with power, in a fourth configuration of the power-saving mode.

In another specific embodiment, control device 1 controls all configurations of the power-saving mode, and may apply these as needed.

When it is stated in the present patent application that components or elements of projector 10 are switched off, in one specific embodiment these components or elements of projector 10 may also be placed in a low-power or ultralow-power mode.

Figure 4:
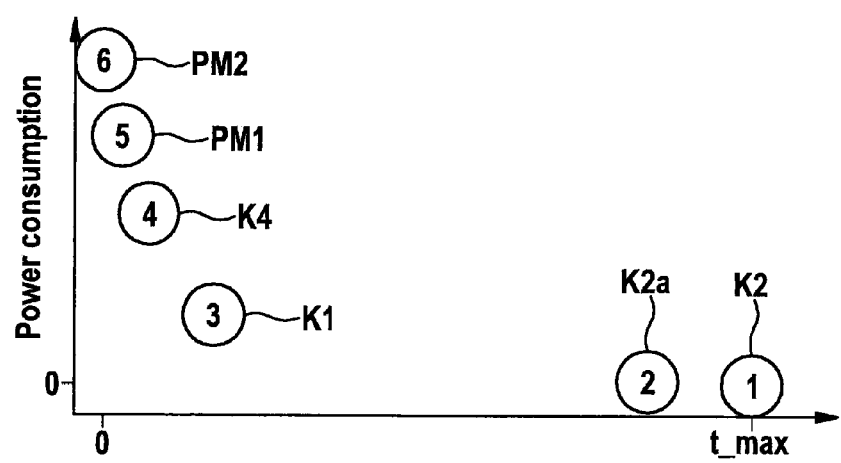
FIG. 4 shows a diagram for illustrating the start-up time, from various operating modes, of one specific embodiment of a projector according to the present invention.

FIG. 4 shows a diagram for illustrating the start-up time, from various operating modes, of one specific embodiment of a projector 10 according to the present invention.

In the diagram in FIG. 4, time is plotted on the abscissa axis, point in time t_max denoting that period of time needed by the projector in order to switch from a state having reduced power consumption into a normal projection mode.

The energy consumption in the corresponding operating mode is plotted on the ordinate axis of the diagram.

In addition, six points are labeled in the diagram. First points K2 and K2a denote the operation of the projector in the second configuration of the power-saving mode. First point K2 signifies that all components of projector 10 are switched off. Second point K2a signifies that all components of projector 10 are placed in a low-power or ultralow-power mode. First point K2 is located at maximum time t_max and at an energy consumption of zero. The second point is located at approximately 80% of the maximum time and at approximately 5% of the maximum energy consumption.

Third point K1 is located at approximately 20% of maximum time t_max and at approximately 30% of the maximum energy consumption.

Third point K1 in the diagram denotes the first configuration of the power-saving mode of one specific embodiment of a projector 10 according to the present invention.

Fourth point K4 denotes the fourth configuration of the power-saving mode of one specific embodiment of a projector 10 according to the present invention. Fourth point K4 is located at approximately 10% of maximum time t_max and at approximately 50% of the maximum energy consumption.

Lastly, points PM1 and PM2 are plotted, point PM1 being located at 5% of maximum time t_max and at approximately 80% of the maximum energy consumption, and point PM2 being located at approximately 0% of maximum time t_max and at approximately 100% of the maximum energy consumption.

Point PM1 denotes a projection mode of one specific embodiment of a projector 10 according to the present invention in which no content is displayed, but all components of projector 10 are ready for operation.

Point PM2 denotes a projection mode of one specific embodiment of a projector 10 according to the present invention in which projector 10 displays video content.

The points extend from point PM2 to point K2 approximately along a curve of the type $y=e^{(-x)}$.

The illustrated points for the energy consumption of a projector 10 are intended solely for purposes of illustration, and are not necessarily true to scale. Other specific embodiments of a projector 10 according to the present invention may have different energy consumption curves.

Figure 5:
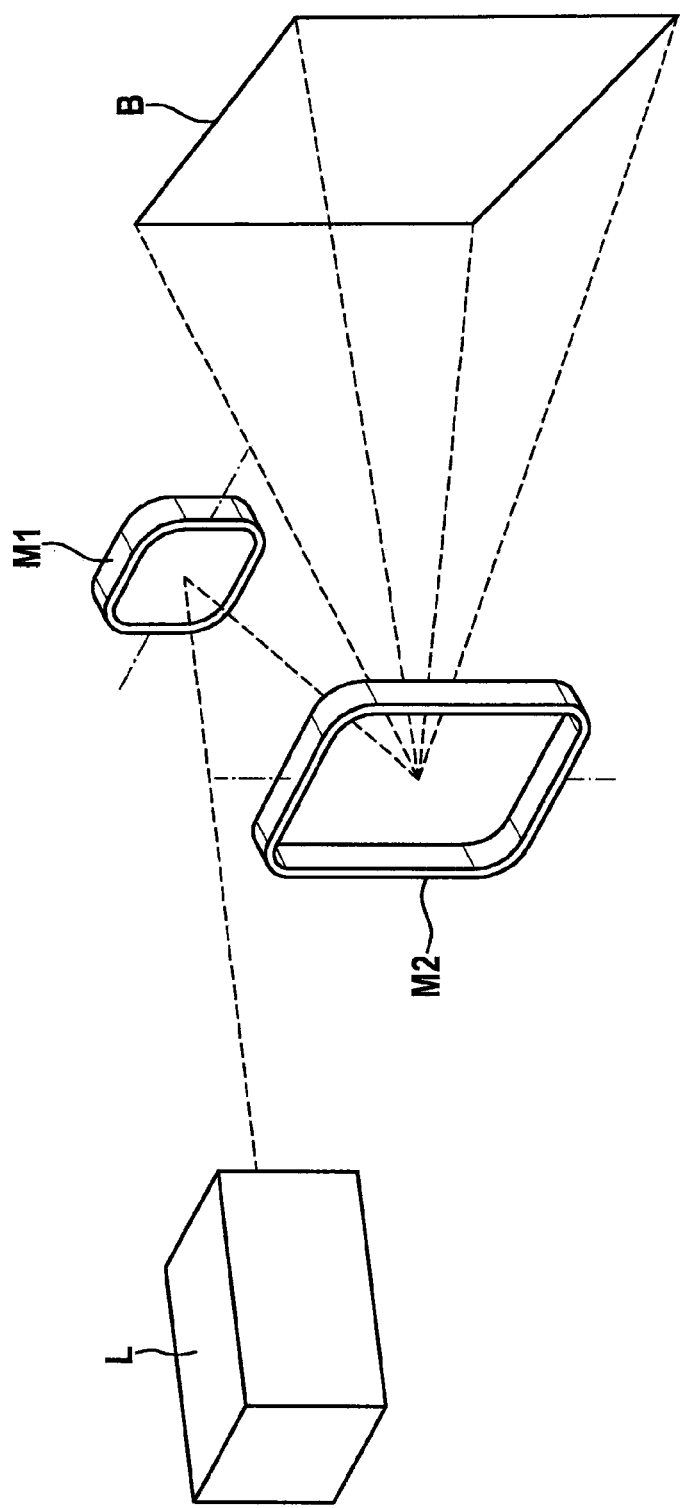
FIG. 5 shows a block diagram of another specific embodiment of a projector according to the present invention.

FIG. 5 shows a block diagram of another specific embodiment of a projector 10 according to the present invention.

Projector 10 in FIG. 5 has a pulsed RGB (red, green, blue) laser light source L which emits its light onto a MEMS micromirror M1, which deflects the light from top to bottom at a frequency of 60 Hz. In addition, projector 10 in FIG. 5 has a second mirror M2 which deflects the light from left to right at a frequency of 22 kHz. Projected image B thus results from the combination of the two mirrors M1 and M2.

In one specific embodiment, a projector 10 according to the present invention may also be equipped with only one controllable resonant mirror 4 which oscillates in two orthogonal directions.

Although the present invention has been described above with reference to preferred exemplary embodiments, it is not limited thereto, and may be modified in numerous ways. In particular, the present invention may be changed or modified in various ways without departing from the core of the present invention.

What is claimed is:

1. A projector, comprising:
   at least one laser diode for emitting light;
   a laser control device for controlling the laser diode;
   a first controllable resonant mirror for reflecting a light that is emitted by the laser diode;
   a control device for controlling an orientation of the first controllable resonant mirror, wherein the control device reduces a power supply to the laser diode and to the laser control device in a first configuration of a power-saving mode of the projector, and wherein the control device further controls the orientation of the first controllable resonant mirror at a resonant frequency of the first controllable resonant mirror.

2. The projector as recited in claim 1, further comprising:
   a second controllable mirror, wherein the control device controls at least one of the orientation of the first controllable resonant mirror and an orientation of the second controllable mirror in the power-saving mode.

3. The projector as recited in claim 2, wherein the control device sets the orientation of the second controllable mirror in at least one movable axis of the second controllable mirror in a practically steady-state manner.

4. The projector as recited in claim 2, wherein the control device includes a first driver device that includes at least one of a first actuating device for controlling the orientation of the first controllable resonant mirror and a second actuating device for controlling the orientation of the second controllable mirror.

5. The projector as recited in claim 1, wherein in the power-saving mode, the control device controls the orientation of the first controllable resonant mirror in at least one movable axis of the first controllable resonant mirror at a resonant frequency of the first controllable resonant mirror in the at least one movable axis of the first controllable resonant mirror.

6. The projector as recited in claim 1, wherein one of:
   in the power-saving mode, the control device controls the orientation of the first controllable resonant mirror in at least one movable axis of the first controllable resonant mirror at a resonant frequency of the first controllable resonant mirror in the at least one movable axis of the first controllable resonant mirror, with an amplitude that corresponds to a control amplitude of the first controllable resonant mirror in a normal projection mode of the projector, and
   in the power-saving mode, the control device controls the orientation of the first controllable resonant mirror in at least one movable axis of the first controllable resonant mirror at a resonant frequency of the first controllable resonant mirror in the at least one movable axis of the first controllable resonant mirror, with an amplitude that is smaller than the control amplitude of the first controllable resonant mirror in a normal projection mode of the projector.

7. The projector as recited in claim 4, wherein the control device at least one of:
   switches off the laser diode, the laser control device, the driver device, and the second actuating device, and supplies the first actuating device with power, in the first configuration of the power-saving mode,
   switches off the laser diode, the laser control device, the driver device, and at least one of the first actuating device and the second actuating device in a second configuration of the power-saving mode,
   switches off the laser diode and the laser control device, and supplies the driver device, the first actuating device, and the second actuating device with power, in a third configuration of the power-saving mode, and
   switches off the laser diode and the laser control device, and supplies the driver device, the first actuating device, the second actuating device, and a video controller of the projector with power, in a fourth configuration of the power-saving mode.

8. A method for controlling a projector including at least one laser diode for emitting light, a laser control device for controlling the laser diode, a first controllable resonant mirror for reflecting a light that is emitted by the laser diode, a control device for controlling an orientation of the first controllable resonant mirror, wherein the control device reduces a power supply to the laser diode and to the laser control device in a first configuration of a power-saving mode of the projector, and wherein the control device further controls the orientation of the first controllable resonant mirror at a resonant frequency of the first controllable resonant mirror, the method comprising:
   reducing a power supply to electronic components of the projector in a first configuration of the power-saving mode of the projector; and
   controlling the orientation of the first controllable resonant mirror of the projector in the first configuration of the power-saving mode at the resonant frequency of the first controllable resonant mirror.

9. The method as recited in claim 8, further comprising:
   controlling at least one of the orientation of the first controllable resonant mirror and an orientation of a second controllable mirror in the power-saving mode.

10. The method as recited in claim 9, wherein during the control of the orientation of the second controllable mirror, the orientation of the second controllable mirror in at least one movable axis of the second controllable mirror is set in a practically steady-state manner.

11. The method as recited in claim 8, wherein during the control of the orientation of the first controllable resonant mirror in the power-saving mode, the orientation of the first controllable resonant mirror in at least one movable axis of the first controllable resonant mirror is controlled at a resonant frequency of the first controllable resonant mirror in the at least one movable axis of the first controllable resonant mirror.

12. The method as recited in claim 11, wherein one of:
   during the control of the orientation of the first controllable resonant mirror in the power-saving mode, the orientation of the first controllable resonant mirror in the at least one movable axis of the first controllable resonant mirror is controlled at a resonant frequency of the first controllable resonant mirror in the at least one movable axis of the first controllable resonant mirror, with an amplitude that corresponds to a control amplitude of the first controllable resonant mirror in a normal projection mode of the projector, and
   in the power-saving mode, the orientation of the first controllable resonant mirror in the at least one movable axis of the first controllable resonant mirror is controlled at a resonant frequency of the first controllable resonant mirror in the at least one movable axis of the first controllable resonant mirror, with an amplitude that is smaller than the control amplitude of the first controllable resonant mirror in the normal projection mode of the projector.

13. The method as recited in claim 8, wherein at least one of:
- the laser diode, the laser control device, the driver device, and a second actuating device are switched off, and the first actuating device is supplied with power, in the first configuration of the power-saving mode,
- the laser diode, the laser control device, the driver device, and at least one of the first actuating device and the second actuating device are switched off in a second configuration of the power-saving mode,
- the laser diode and the laser control device are switched off, and the driver device, the first actuating device, and the second actuating device are supplied with power, in a third configuration of the power-saving mode, and
- the laser diode and the laser control device are switched off, and the driver device, the first actuating device, the second actuating device, and a video controller of the projector are supplied with power in a fourth configuration of the power-saving mode.

\* \* \* \* \*